United States Patent [19]
Thörnblad

[11] Patent Number: 4,730,563
[45] Date of Patent: Mar. 15, 1988

[54] POWER PLANT WITH CENTRIFUGAL SEPARATORS FOR RETURNING MATERIAL FROM COMBUSTION GASES TO A FLUIDIZED BED

[75] Inventor: Per Thörnblad, Finspong, Sweden

[73] Assignee: Asea Stal Aktiebolag, Finspong, Sweden

[21] Appl. No.: 16,706

[22] Filed: Feb. 20, 1987

[30] Foreign Application Priority Data

Feb. 21, 1986 [SE] Sweden ............................ 8600799

[51] Int. Cl.[4] .............................................. F23J 3/00
[52] U.S. Cl. ...................... 110/216; 60/39.5; 122/4 D
[58] Field of Search ............... 122/4 D; 110/245, 216; 60/39.5; 165/104.16

[56] References Cited

U.S. PATENT DOCUMENTS

| | | | |
|---|---|---|---|
| 4,584,949 | 4/1986 | Brannstrom | 122/4 D X |
| 4,590,868 | 5/1986 | Ishihara | 60/39.5 X |
| 4,600,414 | 7/1986 | Metcalfe et al. | 110/216 X |
| 4,669,395 | 6/1987 | Brannstrom | 110/216 |
| 4,679,511 | 7/1987 | Holmes et al. | 110/216 |

*Primary Examiner*—Edward G. Favors
*Attorney, Agent, or Firm*—Pollock, Vande Sande & Priddy

[57] ABSTRACT

A power plant with combustion of a fuel in a fluidized bed (14) enclosed within a combustion chamber in a bed vessel (11). A gas outlet from the bed vessel (11) is formed as a centrifugal separator (20) intended to primarily separate coarse material containing unburnt fuel leaving the bed (11) together with the combustion gases. Suitably the separator (20) extends into the bed vessel (11) and separated material is returned to the bed (14) through a return conduit (34), which is preferably located close to the bed vessel wall. This conduit (34) opens into the bed vessel (11), near the bottom (12) thereof. For the return transport an ejector (35) may be used to overcome the pressure difference existing between the separator (20) and the orifice of the conveying conduit (34). The propellent gas may consist of combustion air from the space (16). If the pressure difference between the space (16) and the orifice of the return tube (34) is insufficient to obtain the necessary driving power, a booster compressor (36) may be used to increase the pressure of the propellent gas.

10 Claims, 3 Drawing Figures

POWER PLANT WITH CENTRIFUGAL SEPARATORS FOR RETURNING MATERIAL FROM COMBUSTION GASES TO A FLUIDIZED BED

TECHNICAL FIELD

The invention relates to a power plant with combustion of a solid fuel in a fluidized bed enclosed within a bed vessel. It is intended both for a plant with combustion at approximately atmospheric pressure and for a plant with combustion at a higher pressure. In the latter case the bed vessel is usually enclosed within a pressure vessel and the combustion gases are utilized for driving a gas turbine. Power plants of this type are commonly called PFBC plants ("PFBC" being the initial letters in the English term Pressurized Fluidized Bed Combustion).

TECHNICAL PROBLEM AND BACKGROUND ART

The combustion gases which leave the bed carry with them material from the bed. This material may contain unburnt fuel which has not been burnt during its dwell time in the bed. Particularly at a high load with a high bed level and a large gas flow, coarse bed material—both fuel particles and absorbent particles—are thrown up high in the freeboard, and a certain amount of these coarse particles is carried away from the bed vessel together with the combustion gases. It is known to return material from dust separators for burning such material and hence increase the degree of combustion.

DISCLOSURE OF THE INVENTION

According to the invention, outlets from the bed vessel are formed as cylindrical channels forming centrifugal separators for separating the coarsest dust. These centrifugal separators may have a simple design since their task is primarily to separate coarser particles, and therefore a relatively low degree of separation may be sufficient. The separation of the coarsest particles from the combustion gases in special separators ahead of the actual gas cleaning plant means, in addition to the return of unburnt fuel and unconsumed bed material, a reduced load on the following cleaning plant. Particularly in a cleaning plant provided with cyclones this separation of the coarse particles is valuable, since coarse particles may cause erosion at the cyclone inlet.

The separator comprises a first cylinder with guide vanes at the inlet which impart a rotating movement to the combustion gases, so that dust is collected at the periphery, and a second cylinder sliding into the first one and together with this forming an annular gap, through which dust and part of the gas are diverted. Via a conveying pipe, separated material is returned down into the bed. For the return transport, an ejector may be used to overcome the pressure difference between the separator and the return feed point and to bring about the driving power necessary for the transport.

The centrifugal separator is suitably constructed such that the first cylinder extends into the bed vessel and the second cylinder consists of a part of a tube, sliding into the first cylinder, for the removal of combustion gas to a cleaning plant. An annular gap, formed between the cylinders, communicates with a return conduit which opens out into the lower part of the bed vessel and into the fluidized bed.

BRIEF DESCRIPTION OF THE DRAWINGS

The invention will be described in greater detail with reference to the accompanying drawing, wherein FIG. 1 schematically shows a PFBC plant to which the invention is applied.

DESCRIPTION OF THE PREFERRED EMBODIMENT

Figure 1:
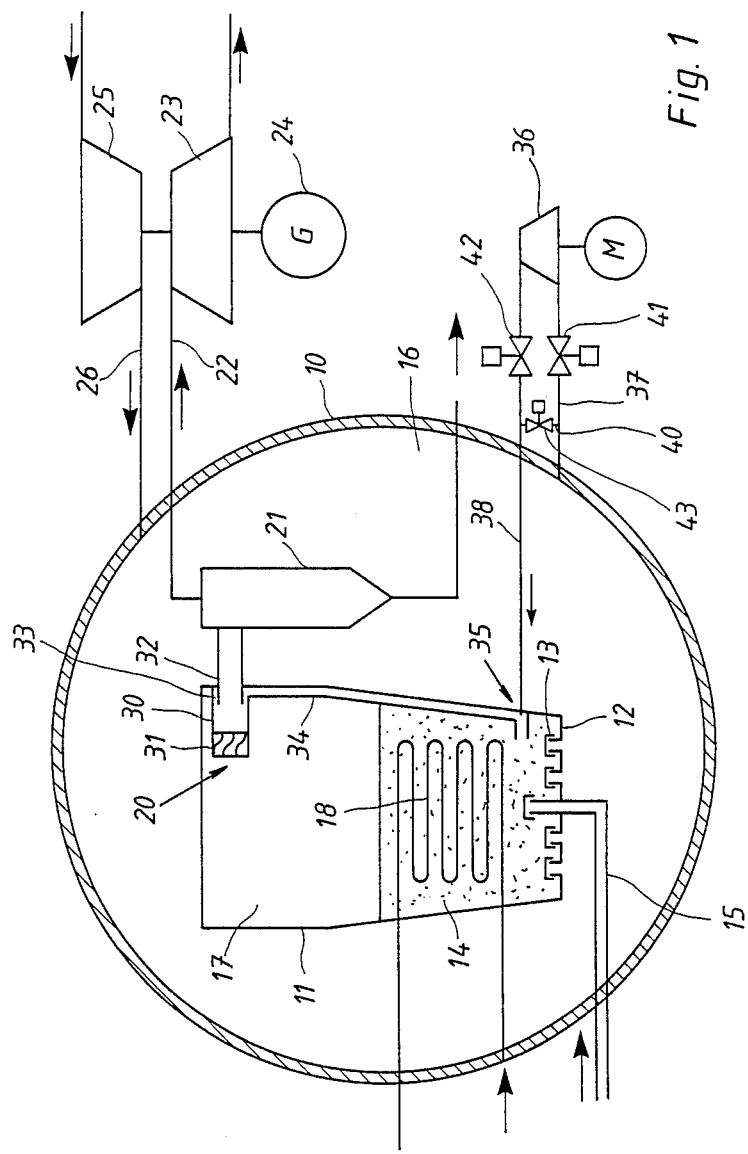

In the figures, 10 designates a pressure vessel surrounding a bed vessel 11. The bed vessel 11 is provided with a bottom 12 with air nozzles and supports a bed 14. Fuel is fed in through the fuel pipe 15. Tubes 18 are arranged in the lower part of the bed vessel 11 for heating water or generating steam and cooling the bed 14. Air for fluidizing the bed 14 and combustion of the fuel is supplied through the air nozzles 13 from the space 16 between the pressure vessel 10 and the bed vessel 11. Combustion gases are collected in the freeboard 17 above the bed 14 and leave the bed vessel 11 via the centrifugal cleaner 20, are further cleaned in the cyclone 21, which symbolizes a cleaning plant with groups of parallel-connected and series-connected cyclones. The cleaned combustion gases are passed in the conduit 22 to the turbine 23, which drives a generator 24 and a compressor 25 which, via the conduit 26, feeds the space 16 with pressurized combustion air.

Figure 2:
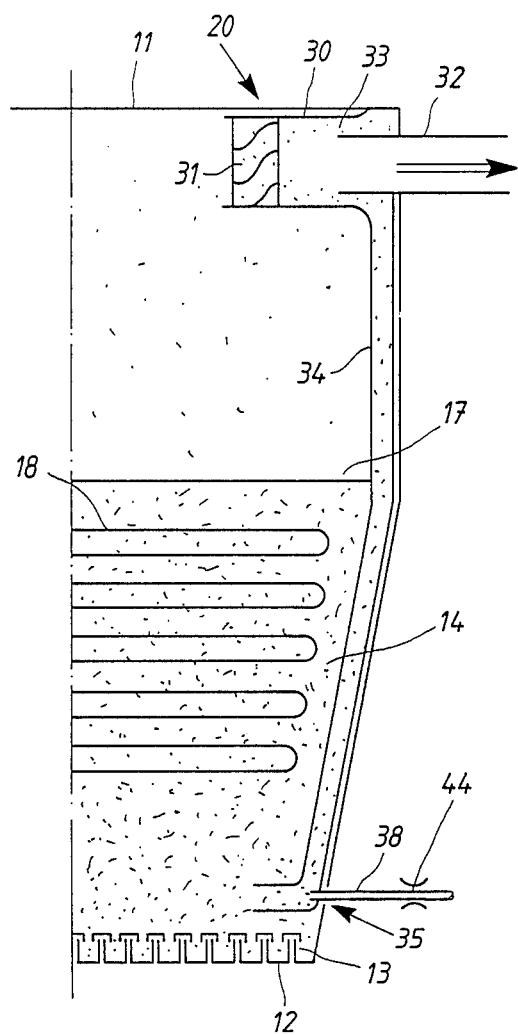
FIGS. 2 and 3 show part of a bed vessel with different embodiments of the return conduit between the centrifugal separator and the bed vessel.

The centrifugal separator 20 comprises a cylinder 30 which extends into the bed vessel 11, guide vanes 31 at the inlet and a cylinder or a tube 32 which slides into the cylinder 30 and conducts partially cleaned gas to the cyclone 21. Between the cylinder 30 and the tube 32, sliding into the cylinder 30, there is formed a gap 33 through which particles and dust collected at the periphery are led away via the conduit 34 to the lower part of the bed vessel 11. As shown in FIGS. 1 and 2, the return feed can be made with the aid of an ejector 35.

A pressure difference always prevails between the space 16 and the interior of the bed vessel 11 because of the pressure drop in the nozzles 13 of the bed bottom 12 and in the fluidized bed 14 downstream of the orifice of the return feed conduit 34. This pressure difference may be sufficient for obtaining, in the ejector 35, the necessary effect for the return of the separated material.

The ejector 35 can be supplied with propellent gas from the space 16, either directly or via a booster compressor 36 which, on its suction side, communicates with the space 16 via the conduit 37 and which, on its pressure side, communicates with the ejector 35 via the conduit 38. The power consumption in this type of arrangement is low. Between the conduits 37 and 38 a bypass 40 may be provided, and in the conduits 37, 38, 40 valves 41, 42, 43 may be provided. With these valves 41–43 the ejector 35 may be supplied with propellent gas from the space 16 via the conduit 37, the conduit 40 with an open valve 43 and the conduit 38 when the pressure difference between the space 16 and the orifice of the return conduit 34 is sufficient to provide the necessary driving power, or via the conduit 37 with an open valve 41, the compressor 36 and the conduit 38 with an open valve 42 when a greater driving power is needed. In the former case the valves 42 and 43 are closed, and in the latter case the valve 43 in the by-pass 40 is closed.

If the pressure difference between the space 16 and the bed vessel 11 under all operating conditions is so great as to be able to impart to the ejector the necessary driving power for the return feed, the booster compressor 36 may be dispensed with. In that case, the tube 38 can be allowed to open out directly into the space 16 and the inlet be provided with a throttle means 44 which is capable of being adjusted so as to obtain a suitable air flow to the ejector 35.

Figure 3:
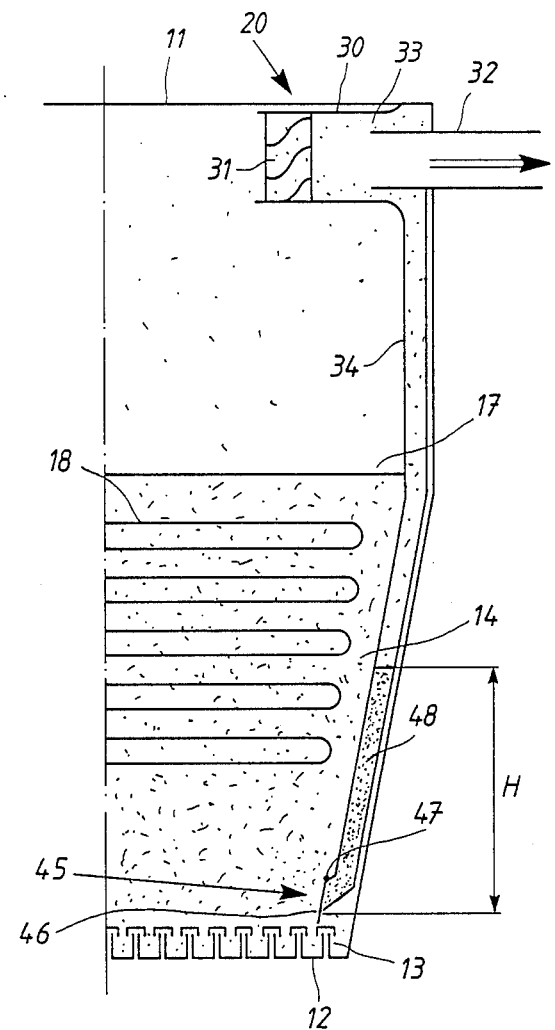

In the alternative embodiment according to FIG. 3, the return conduit 34 is provided with a nonreturn valve 45 which is designed as a flap 46 articulately suspended from a shaft 47. This valve 45 prevents the flow of gas and material from the bed 14 towards the separator 20. When separated material 48 has been collected in the lower part of the conduit 34 to a height H, so that the pressure of the material against the inner side of the flap 46 exceeds the power of the gas pressure difference between the two sides of the flap 46, the valve 45 opens and separated material flows into the bed 14 until an equilibrium has been attained and the valve flap 46 closes the outlet.

I claim:

1. A power plant with a bed vessel with combustion of a fuel in a fluidized bed of a particulate material and a cleaning plant for separation of solid particles in combustion gases leaving the bed vessel, characterized in that the cleaning plant comprises a coarse cleaner (20) close to the outlet from the combustion chamber (11) with return of separated material, said coarse cleaner including a first cylinder (30) with guide vanes (31) which impart a rotating movement to the gas flow, a second cylinder (32) downstream of the first cylinder (30), an annular gap (33) formed between the cylinders, a space around the second cylinder (32) into which the gap (33) opens out and in which separated material is collected, and a return conduit for returning separated material from said space to the bed, and downstream of the coarse cleaner a cleaner (21) of a cyclone type for separating solid particles which have passed through the coarse cleaner (20).

2. A power plant according to claim 1, characterized in that the coarse cleaner is located in the wall of the bed vessel and completely or partially extends into the bed vessel.

3. A power plant according to claim 1 or 2, characterized in that the annular gaps (33) of a plurality of separators (20) open into a common space and that material separated in said space communicates, via a conduit (34), with the bed portion of the bed vessel (11).

4. A power plant according to claim 3, characterized in that a conveying conduit (34) for returning separated material is arranged inside the bed vessel (11).

5. A power plant according to claim 1 or 2, characterized in that an ejector device is provided in the return conduit (34) for separated material to overcome the pressure difference existing between the annular gap (33) and the orifice of the return conduit (34).

6. A power plant according to claim 5, characterized in that, in a PFBC power plant with the bed vessel (11) enclosed within a pressure vessel (10), the ejector (35) communicates with a space (16) between the pressure vessel (10) and the bed vessel (11) and is supplied with propellent gas from said space (16).

7. A power plant according to claim 5, characterized in that, in a PFBC power plant with the bed vessel (11) enclosed within a pressure vessel (10), the ejector (35) communicates with a space (16) between the pressure vessel (10) and the bed vessel (11) and that this communication includes a booster compressor (36) for increasing the pressure of the gas supplied to the ejector (35) from the space (16).

8. A power plant according to claim 1 or 2, characterized in that the return conduit (34), at its orifice in the bed vessel (11), is provided with a nonreturn valve which prevents flow from the bed (14) towards the centrifugal separator (20).

9. A power plant according to claim 4 characterized in that an ejector device is provided in the return conduit (34) for separated material to overcome the pressure difference existing between the annular gap (33) and the orifice of the return conduit (34).

10. A power plant according to claim 4 characterized in that the return conduit (34), at its orifice in the bed vssel (11), is provided with a non return valve which prevents flow from the bed (14) towards the centrifugal separator (20).

* * * * *